(12) United States Patent
Tsai et al.

(10) Patent No.: US 9,661,201 B2
(45) Date of Patent: May 23, 2017

(54) IMAGE MONITORING APPARATUS (71) Applicant: VIVOTEK INC., New Taipei (TW)

(72) Inventors: Chiung-Wei Tsai, New Taipei (TW);
Yi-Hsin Yeh, New Taipei (TW);
Chih-Hung Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/846,834

(22) Filed: Sep. 7, 2015

(65) Prior Publication Data
US 2016/0088202 A1 Mar. 24, 2016

(30) Foreign Application Priority Data

Sep. 24, 2014 (TW) .............................. 103133105 A (51) Int. Cl.
*H04N 5/225* (2006.01)
*G02B 13/00* (2006.01)
(52) U.S. Cl.
CPC ....... *H04N 5/2254* (2013.01); *G02B 13/0015* (2013.01); *H04N 5/2252* (2013.01); *H04N 5/2256* (2013.01)
(58) Field of Classification Search
CPC .. H04N 5/2251; H04N 5/2252; H04N 5/2256; H04N 5/2254; G03B 17/08; G03B 2215/05; G03B 2215/0517; G03B 2215/0542; G03B 2217/002; G08B 13/19617; G08B 13/19619; G08B 13/19626; G02B 13/0015
See application file for complete search history.

(56) References Cited

U.S. PATENT DOCUMENTS

| | | | | |
|---|---|---|---|---|
| 6,507,700 B1* | 1/2003 | Takekuma | ............. | G03B 17/08 348/81 |
| 6,855,111 B2* | 2/2005 | Yokoi | .................... | A61B 1/041 348/68 |
| 7,543,373 B2* | 6/2009 | McAllister | ........... | H05K 1/0271 156/313 |
| 2004/0012715 A1* | 1/2004 | Gin | .................. | G08B 13/19619 348/375 |
| 2005/0264686 A1* | 12/2005 | Tenmyo | ................. | G03B 15/05 348/370 |
| 2006/0087583 A1* | 4/2006 | Wubs | ................... | H04N 5/2256 348/370 |

(Continued)

*Primary Examiner* — Lin Ye
*Assistant Examiner* — Chriss Yoder, III
(74) *Attorney, Agent, or Firm* — Winston Hsu; Scott Margo (57) ABSTRACT

An image monitoring apparatus includes a casing, a camera module in the casing, and a lighting module disposed on the casing and located above or under the camera module on a plane corresponding to a vertical angle of view of the camera module. A horizontal light-emitting plane of a LED of the lighting module is perpendicular to the plane corresponding to the vertical angle of view. A lens of the lighting module covers the LED and has a convex light-exit surface, a bottom surface, and a concave light-entrance surface. A long axis of the convex light-exit surface is located at the horizontal light-emitting plane. A section thickness of the lens from the concave light-entrance surface to the convex light-exit surface along the long axis is greater than a section thickness of the lens from the concave light-entrance surface to the convex light-exit surface along a normal of the bottom surface.

19 Claims, 6 Drawing Sheets

(56) References Cited

U.S. PATENT DOCUMENTS

| | | | | |
|---|---|---|---|---|
| 2010/0097468 A1* | 4/2010 | Mayer | ............... | G02B 27/0911 |
| | | | | 348/148 |
| 2010/0321497 A1* | 12/2010 | Onishi | ............... | B60R 1/10 |
| | | | | 348/148 |
| 2013/0064531 A1* | 3/2013 | Pillman | ............... | H04N 5/23296 |
| | | | | 396/62 |
| 2013/0322088 A1* | 12/2013 | Huang | ............... | F21V 5/004 |
| | | | | 362/311.02 |
| 2014/0334149 A1* | 11/2014 | Nolan | ............... | F21V 5/007 |
| | | | | 362/235 |

* cited by examiner

IMAGE MONITORING APPARATUS

BACKGROUND OF THE INVENTION

1. Field of the Invention

The present invention relates to an image monitoring apparatus, and more specifically, to an image monitoring apparatus disposing a lens on a light emitting diode for adjusting a light emitting angle of the light emitting diode.

2. Description of the Prior Art

In general, a monitoring camera has a light source disposed therein for providing auxiliary light to capture clear images when the monitoring camera is operated in a dark environment. Furthermore, the monitoring camera could also have a fisheye lens or a wide angle lens disposed thereon for expanding its image capturing range.

However, since the monitoring camera usually utilizes a light emitting diode (e.g. a visible light emitting diode or an infrared light emitting diode) as the aforesaid light source, the monitoring camera could capture clear images only within the image capturing range of about 120° in a dark environment due to the limited light emitting angle (about 120°) of the light emitting diode, so as to influence the image monitoring efficiency of the monitoring camera.

SUMMARY OF THE INVENTION

The present invention provides an image monitoring apparatus including a casing, a camera module, and at least one lighting module. The camera module is disposed in the casing for capturing an image. The camera module has a horizontal angle of view and a vertical angle of view. The at least one lighting module is disposed on the casing and is located above or under the camera module on a plane corresponding to the vertical angle of view of the camera module. The at least one lighting module includes a circuit board, a light emitting diode, and a lens. The circuit board is disposed in the casing. The light emitting diode is disposed on the circuit board. The horizontal light-emitting plane of the light emitting diode is perpendicular to the plane corresponding to the vertical angle of view. The lens is disposed on the casing. The lens covers the light emitting diode and has a convex light-exit surface, a bottom surface, and a concave light-entrance surface. The concave light-entrance surface is sunken inwardly from the bottom surface toward the convex light-exit surface. A long axis of the convex light-exit surface is located at the horizontal light-emitting plane of the light emitting diode. A section thickness of the lens from the concave light-entrance surface to the convex light-exit surface along the long axis is greater than a section thickness of the lens from the concave light-entrance surface to the convex light-exit surface along a normal of the bottom surface, so as to make a practical horizontal light-emitting angle of light of the light emitting diode after being refracted by the concave light-entrance surface and the convex light-exit surface greater than an original horizontal light-emitting angle of the light of the light emitting diode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
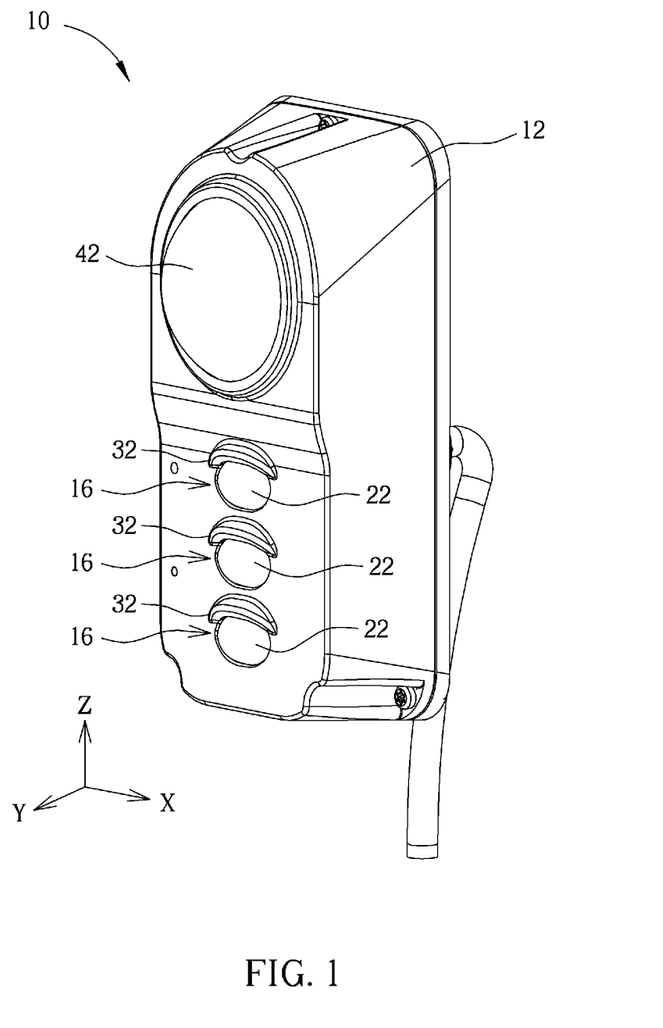
FIG. 1 is a diagram of an image monitoring apparatus according to an embodiment of the present invention.
Figure 2:
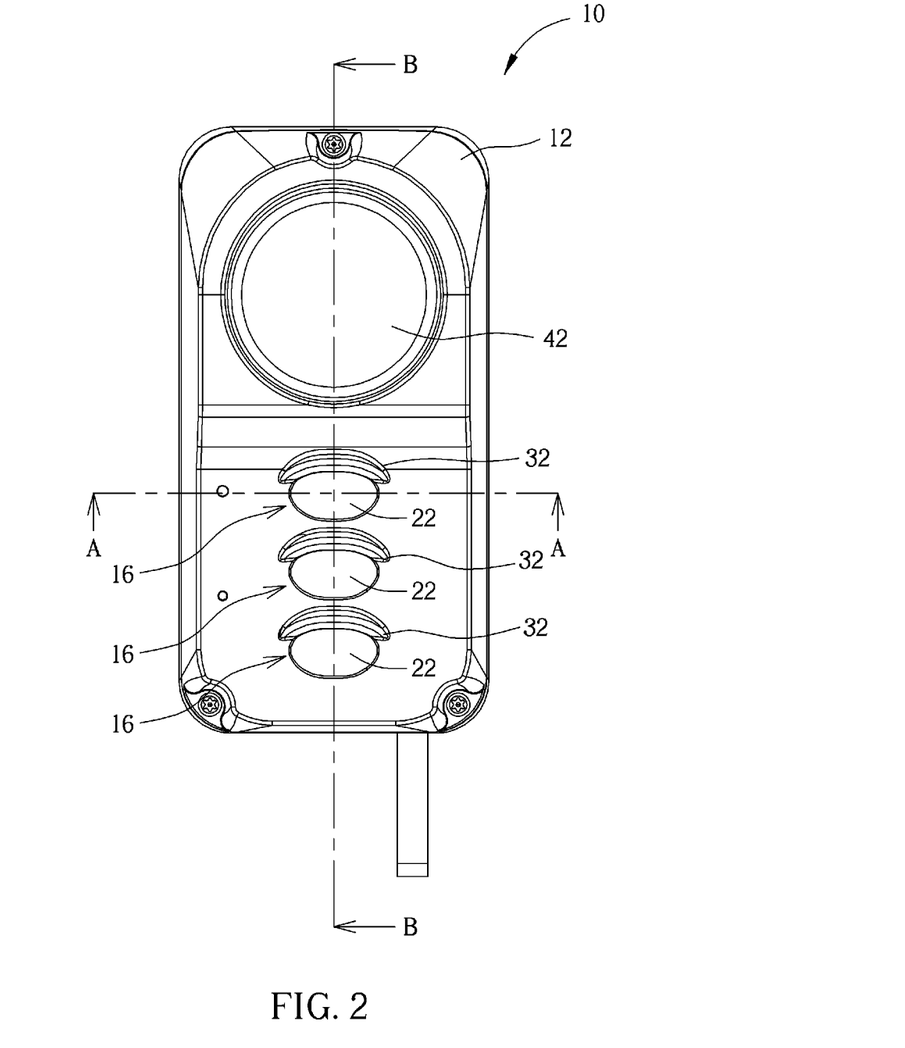
FIG. 2 is a front view of the image monitoring apparatus in FIG. 1.
Figure 3:
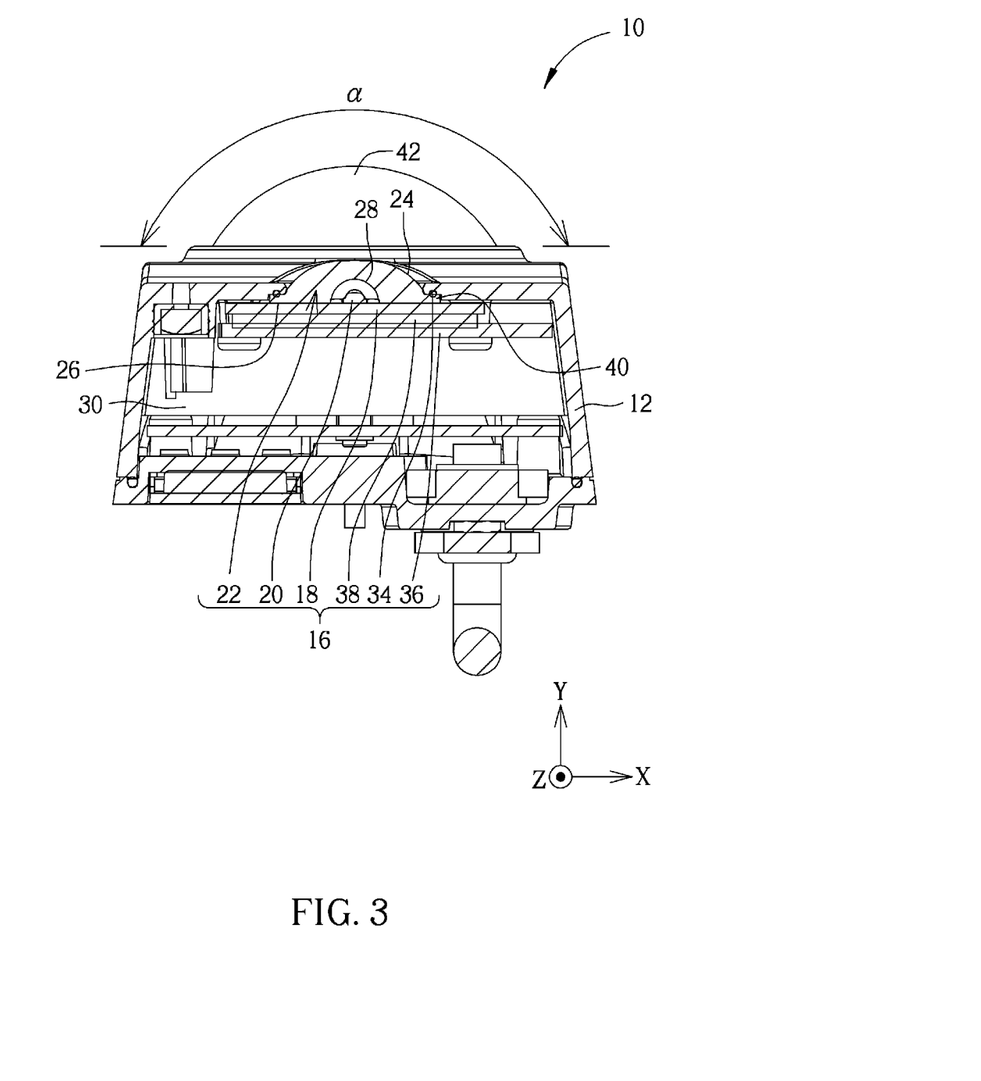
FIG. 3 is a sectional diagram of the image monitoring apparatus in FIG. 2 along a sectional line A-A.
Figure 4:
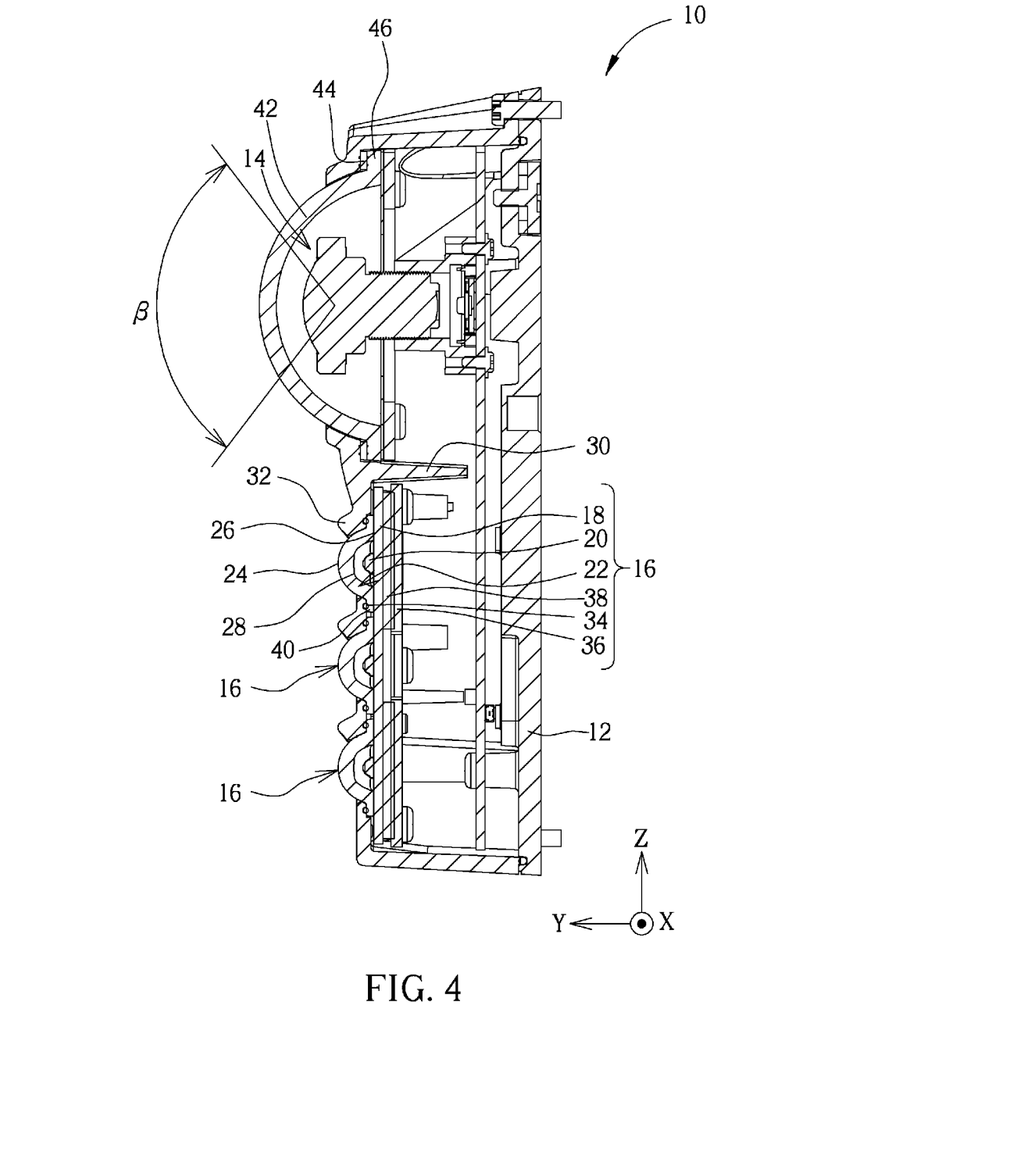
FIG. 4 is a sectional diagram of the image monitoring apparatus in FIG. 2 along a sectional line B-B.

Please refer to FIG. 1, FIG. 2, FIG. 3, and FIG. 4. FIG. 1 is a diagram of an image monitoring apparatus 10 according to an embodiment of the present invention. FIG. 2 is a front view of the image monitoring apparatus 10 in FIG. 1. FIG. 3 is a sectional diagram of the image monitoring apparatus 10 in FIG. 2 along a sectional line A-A. FIG. 4 is a sectional diagram of the image monitoring apparatus 10 in FIG. 2 along a sectional line B-B. The image monitoring apparatus 10 could be a conventional image monitoring device (e.g. a fisheye camera or a cube camera) for image monitoring. As shown in FIGS. 1-4, the image monitoring apparatus 10 includes a casing 12, a camera module 14, and at least one lighting module 16 (three shown in FIG. 1, but not limited thereto). The camera module 14 could be preferably a fisheyelens module, but not limited thereto. The camera module 14 is disposed in the casing 12 for capturing images and has a horizontal angle of view $\alpha$ and a vertical angle of view $\beta$ for defining an image capturing range of the camera module 14.

More detailed description for one of the lighting modules 16 is provided as follows. As for other lighting modules 16, the related description could be reasoned by analogy and omitted herein. The lighting module 16 is disposed on the casing 12 and is located under the camera module 14 on a plane corresponding to the vertical angle of view $\beta$ (but not limited thereto), meaning that the lighting module 16 is located on a YZ plane as shown in FIG. 4. In another embodiment, the image monitoring apparatus 10 could adopt the design that the lighting module 16 is located above the camera module 14 on the plane corresponding to the vertical angle of view $\beta$. As for which design is utilized, it depends on the practical application of the image monitoring apparatus 10. The lighting module 16 includes a circuit board 18, a light emitting diode 20, and a lens 22. The circuit board 18 is disposed in the casing 12 for controlling the light emitting diode 20. The light emitting diode 20 is disposed on the circuit board 18 and could be preferably an infrared light emitting diode (but not limited thereto, meaning that the light emitting diode 20 could be other type of light emitting diode, such as a visible light emitting diode). As shown in FIG. 3 and FIG. 4, a horizontal light emitting plane of the light emitting diode 20, which is an XY plane as shown in FIG. 3, is substantially perpendicular to the plane corresponding to the vertical angle of view $\beta$. In other words, the horizontal light emitting plane of the light emitting diode 20 is substantially parallel to a plane corresponding to the horizontal angle of view $\alpha$ (i.e. the XY plane as shown in FIG. 3).

Figure 5:
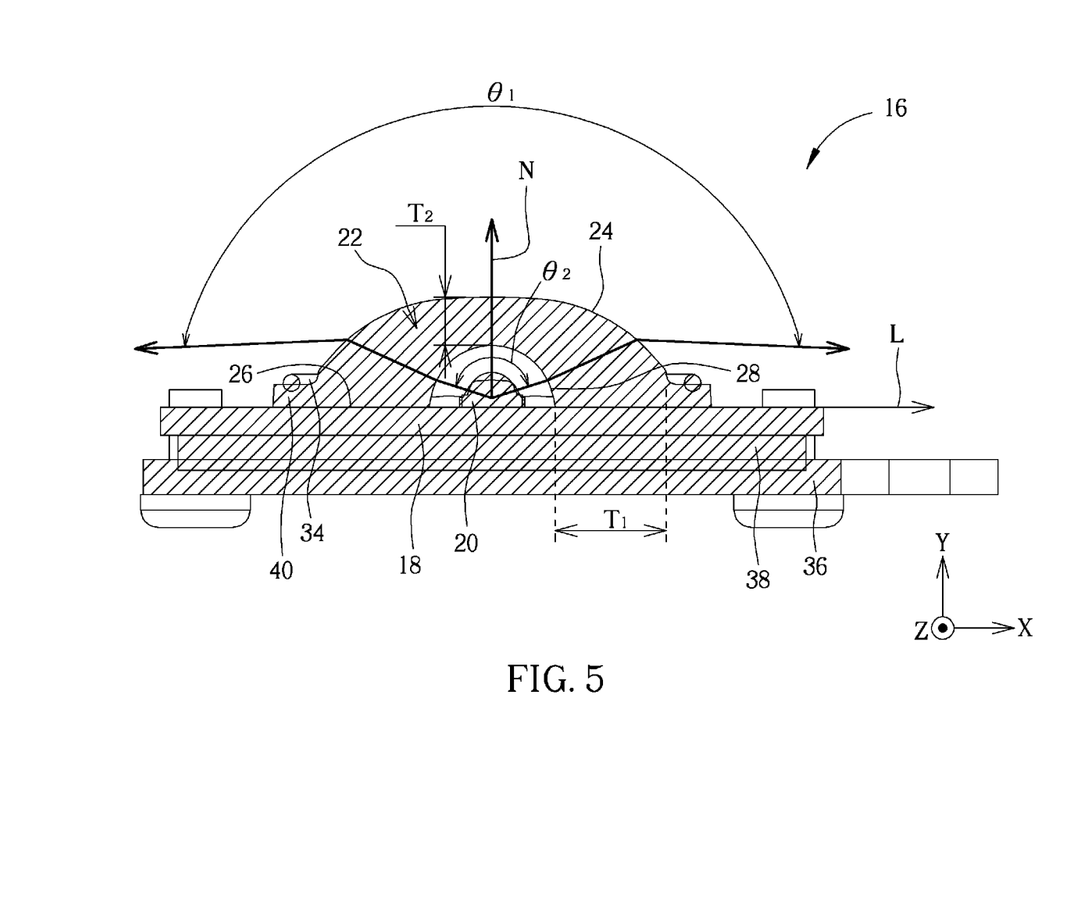
FIG. 5 is an enlarged diagram of a lighting module in FIG. 3.
Figure 6:
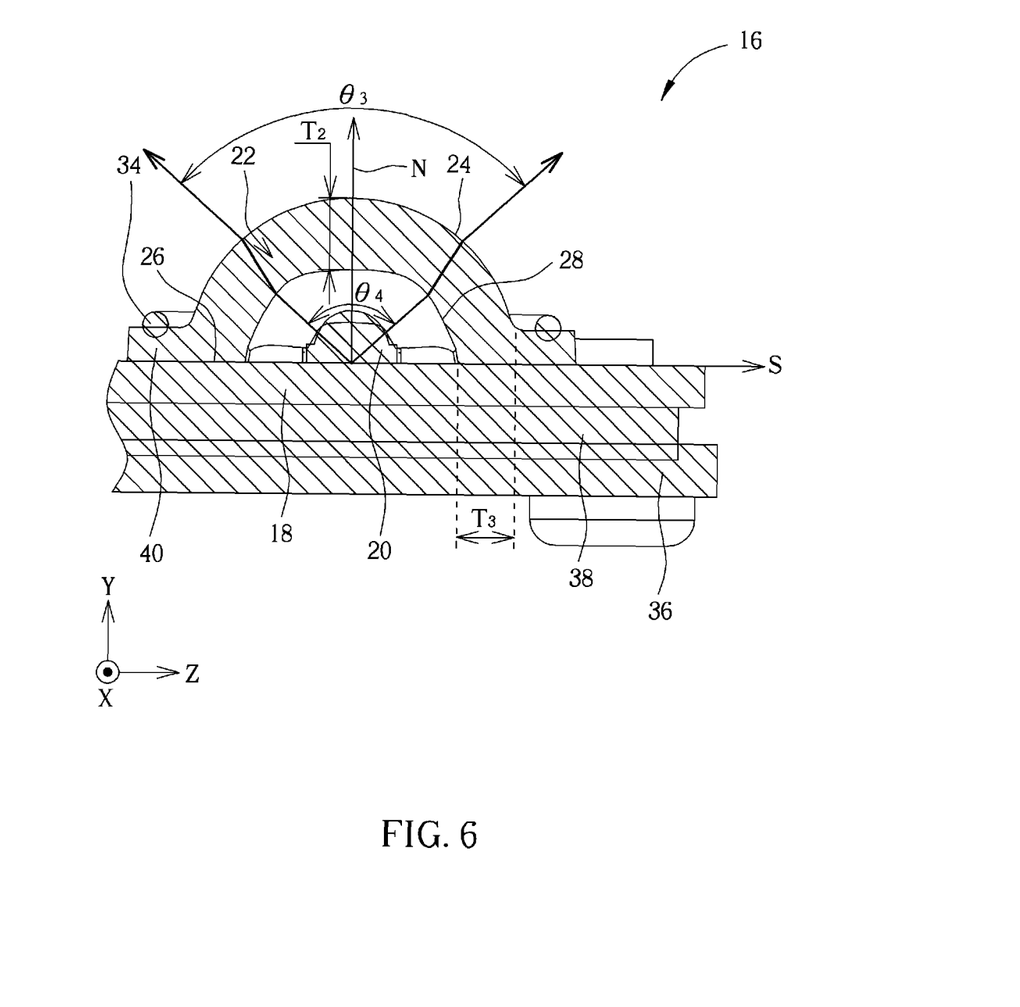
FIG. 6 is a partial enlarged diagram of the lighting module in FIG. 4.

Please refer to FIG. 5 and FIG. 6. FIG. 5 is an enlarged diagram of the lighting module 16 in FIG. 3. FIG. 6 is a partial enlarged diagram of the lighting module 16 in FIG. 4. The lens 22 is disposed on the casing 12 and covers the light emitting diode 20. The lens 22 has a convex light-exit surface 24, a bottom surface 26, and a concave light-entrance surface 28. The concave light-entrance surface 28 is sunken inwardly from the bottom surface 26 toward the convex light-exit surface 24. A long axis L (i.e. an X-axis as shown in FIG. 5) of the convex light-exit surface 24 is located at the horizontal light-emitting plane of the light emitting diode 20 on the XY plane as shown in FIG. 5. A section thickness $T_1$ of the lens 22 from the concave light-entrance surface 28 to the convex light-exit surface 24 along the long axis L is greater than a section thickness $T_2$ of the lens 22 from the concave light-entrance surface 28 to the convex light-exit surface 24 along a normal N of the bottom surface 26, so as to make a practical horizontal light-emitting angle $\theta_1$ of light of the light emitting diode 20 after being refracted by the concave light-entrance surface 28 and the convex light-exit surface 24 greater than an original horizontal light-emitting angle $\theta_2$ of the light of the light emitting diode 20 (as shown in FIG. 5). To be more specific, via the aforesaid lens design, in this embodiment, the practical horizontal light-emitting angle $\theta_1$ of light of the light emitting diode 20 after being refracted by the concave light-entrance surface 28 and the convex light-exit surface 24 could be preferably greater than or equal to the horizontal angle of view α of the camera module 14. In such a manner, the lighting module 16 could provide auxiliary light with the light emitting angle greater than or equal to the horizontal angle of view α of the camera module 14 for expanding the image capturing range of the image monitoring apparatus 10, so as to greatly improve the image monitoring efficiency of the image monitoring apparatus 10 in a dark environment.

On the other hand, in this embodiment, as shown in FIG. 6, a short axis S (i.e. a Z-axis as shown in FIG. 6) of the convex light-exit surface 24 of the lens 22 is located at a vertical light-emitting plane (i.e. the YZ plane as shown in FIG. 6) of the light emitting diode 20, and a section thickness $T_3$ of the lens 22 from the concave light-entrance surface 28 to the convex light-exit surface 24 along the short axis S of the convex light-exit surface 24 could be less than or equal to the section thickness $T_2$ of the lens 22 from the concave light-entrance surface 28 to the convex light-exit surface 24 along the normal N of the bottom surface 26, so as to make a practical vertical light-emitting angle $\theta_3$ of the light of the light emitting diode 20 after being refracted by the concave light-entrance surface 28 and the convex light-exit surface 24 less than or equal to an original vertical light-emitting angle $\theta_4$ of the light of the light emitting diode 20 (as shown in FIG. 6). In such a manner, the present invention could prevent the practical vertical light-emitting angle $\theta_3$ of the light of the light emitting diode 20 from being excessive to make the light of the light emitting diode 20 incident to the camera module 14, so as to efficiently avoid the hot spot problem occurring on images captured by the camera module 14. Furthermore, as shown in FIG. 4, in this embodiment, the lens 22 could preferably disposed outside the range of the vertical angle of view β of the camera module 14 so as to prevent the camera module 14 from capturing an image of the lens 22.

The image monitoring apparatus 10 provided by the present invention could further adopt the light blocking design and the shock absorbing design for improving the image capturing quality and durability of the image monitoring apparatus 10. As shown in FIG. 1 and FIG. 4, a wall 30 extends inwardly from the casing 12 and is located between the camera module 14 and the lens 22, and a protruding block 32 is disposed at a side of the convex light-exit surface 24 of the lens 22 close to the camera module 14. In this embodiment, the protruding block 32 preferably extends from the casing 12. In such a manner, the wall 30 could be used to block the light of the light emitting diode 20 in the casing 12 from reflecting to the camera module 14, and the protruding block 32 could be used to block the light of the light emitting diode 20 from being directly incident to the camera module 14 so as to efficiently avoid the hot spot problem occurring on images captured by the camera module 14. To be noted, the structural design for blocking the light of the light emitting diode 20 from being incident to the camera module 14 is not limited to the aforesaid embodiment. For example, in another embodiment, the protruding block 32 could be formed integrally with the lens 22 (e.g. by an injection molding process). In an embodiment that the protruding block 32 is omitted, the image monitoring apparatus 10 could adopt the design that a section of the lens 22 close to the camera module 14 is made of opaque material by a conventional forming process (e.g. a dual injection molding process or an ultrasonic bonding process), to achieve the aforesaid light blocking purpose.

As shown in FIG. 4 and FIG. 5, in this embodiment, the lighting module 16 could further include a first waterproof washer 34, a bottom board 36, and a buffer pad 38, and the lens 22 could have a first skirt portion 40 extending outwardly. The first waterproof washer 34 is connected to the first skirt portion 40 and the casing 12 for waterproof. The bottom board 36 (e.g. a metal laminated board) could be disposed in the casing 12, and the buffer pad 38 (e.g. thermally conductive silicone) is connected to the bottom board 36 and the circuit board 18. Accordingly, even if the light module 16 receives external impact, the lighting module 16 could be retracted back into the casing 12 with elastic deformation of the buffer pad 38 for shock absorption and the external impact could be transferred by the bottom board 36 for preventing damage of the lighting module 16 due to the external impact, so as to prolong life of the image monitoring apparatus 10. Furthermore, the protruding block 32 could efficiently prevent the lighting module 16 from receiving direct impact.

Furthermore, the image monitoring apparatus 10 could further include a transparent cover 42 and a second waterproof washer 44. The transparent cover 42 is disposed on the casing 12 and covers the camera module 14. The transparent cover 42 could have a second skirt portion 46 extending outwardly. The second waterproof washer 44 is connected to the second skirt portion 46 and the casing 12. Accordingly, the image monitoring apparatus 10 could utilize the transparent cover 42 to protect the camera module 14, and could utilize the second waterproof washer 44 to achieve the waterproof purpose.

Compared with the prior art, the present invention adopts the aforesaid lens design to achieve the purpose that the practical horizontal light-emitting angle of the light of the light emitting diode after being refracted by the concave light-entrance surface and the convex light-exit surface of the lens is greater than the original horizontal light-emitting angle of the light of the light emitting diode. In such a manner, the present invention could expand the image capturing range of the image monitoring apparatus in a dark environment, so as to efficiently solve the prior art problem that the monitoring camera could capture clear images only within the image capturing range of about 120° due to the limited light emitting angle (about 120°) of the light emitting diode. Accordingly, the present invention could greatly improve the image monitoring efficiency of the image monitoring apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image monitoring apparatus comprising:
a casing;
a camera module disposed in the casing for capturing an image, the camera module having a horizontal angle of view and a vertical angle of view; and
at least one lighting module disposed on the casing and located above or under the camera module on a plane corresponding to the vertical angle of view of the camera module, the at least one lighting module comprising:
a circuit board disposed in the casing;
a light emitting diode disposed on the circuit board, a horizontal light-emitting plane of the light emitting diode being perpendicular to the plane corresponding to the vertical angle of view; and
a lens disposed on the casing, the lens covering the light emitting diode and having a convex light-exit surface, a bottom surface, and a concave light-entrance surface, the concave light-entrance surface being sunken inwardly from the bottom surface toward the convex light-exit surface, a long axis of the convex light-exit surface being located at the horizontal light-emitting plane of the light emitting diode, and a section thickness of the lens from the concave light-entrance surface to the convex light-exit surface along the long axis being greater than a section thickness of the lens from the concave light-entrance surface to the convex light-exit surface along a normal of the bottom surface, so as to make a practical horizontal light-emitting angle of light of the light emitting diode after being refracted by the concave light-entrance surface and the convex light-exit surface greater than an original horizontal light-emitting angle of the light of the light emitting diode.

2. The image monitoring apparatus of claim 1, wherein the practical horizontal light-emitting angle of the light of the light emitting diode after being refracted by the concave light-entrance surface and the convex light-exit surface is greater than or equal to the horizontal angle of view of the camera module.

3. The image monitoring apparatus of claim 1, wherein a wall extends inwardly from the casing, and the wall is located between the camera module and the lens for blocking the light of the light emitting diode in the casing from being reflected to the camera module.

4. The image monitoring apparatus of claim 1 further comprising:
a protruding block disposed on a side of the convex light-exit surface of the lens close to the camera module for blocking the light of the light emitting diode from being incident to the camera module.

5. The image monitoring apparatus of claim 4, wherein the protruding block extends from the casing.

6. The image monitoring apparatus of claim 4, wherein the protruding block is formed integrally with the lens.

7. The image monitoring apparatus of claim 1, wherein a section of the lens close to the camera module is made of opaque material for blocking the light of the light emitting diode from being incident to the camera module.

8. The image monitoring apparatus of claim 1, wherein the lens is disposed at a position outside a range of the vertical angle of view the camera module.

9. The image monitoring apparatus of claim 1, wherein the lighting module further comprises:
a bottom board disposed in the casing; and
a buffer pad connected to the bottom board and the circuit board.

10. The image monitoring apparatus of claim 1, wherein the lighting module further comprises a waterproof washer, the lens has a skirt portion extending outwardly, and the waterproof washer is connected to the skirt portion and the casing.

11. The image monitoring apparatus of claim 1 further comprising:
a transparent cover disposed on the casing, the transparent cover having a skirt portion extending outwardly and covering the camera module; and
a waterproof washer connected to the skirt portion and the casing.

12. An image monitoring apparatus comprising:
a casing;
a camera module disposed in the casing for capturing an image, the camera module having a horizontal angle of view and a vertical angle of view; and
at least one lighting module disposed on the casing and located above or under the camera module on a plane corresponding to the vertical angle of view of the camera module, the at least one lighting module comprising:
a circuit board disposed in the casing;
a light emitting diode disposed on the circuit board, a horizontal light-emitting plane of the light emitting diode being perpendicular to the plane corresponding to the vertical angle of view; and
a lens disposed on the casing, the lens covering the light emitting diode and having a convex light-exit surface, a bottom surface, and a concave light-entrance surface, the concave light-entrance surface being sunken inwardly from the bottom surface toward the convex light-exit surface, a long axis of the convex light-exit surface being located at the horizontal light-emitting plane of the light emitting diode, a section thickness of the lens from the concave light-entrance surface to the convex light-exit surface along the long axis being greater than a section thickness of the lens from the concave light-entrance surface to the convex light-exit surface along a normal of the bottom surface, so as to make a practical horizontal light-emitting angle of light of the light emitting diode after being refracted by the concave light-entrance surface and the convex light-exit surface greater than an original horizontal light-emitting angle of the light of the light emitting diode, a short axis of the convex light-exit surface of the lens being located at a vertical light-emitting plane of the light emitting diode, and a section thickness of the lens from the concave light-entrance surface to the convex light-exit surface along the short axis of the convex light-exit surface being less than or equal to the section thickness of the lens from the concave light-entrance surface to the convex light-exit surface along the normal of the bottom surface, so as to make a practical vertical light-emitting angle of the light of the light emitting diode after being refracted by the concave light-entrance surface and the convex light-exit surface less than or equal to an original vertical light-emitting angle of the light of the light emitting diode.

13. The image monitoring apparatus of claim 12, wherein the practical horizontal light-emitting angle of the light of the light emitting diode after being refracted by the concave light-entrance surface and the convex light-exit surface is greater than or equal to the horizontal angle of view of the camera module.

14. The image monitoring apparatus of claim 12, wherein a wall extends inwardly from the casing, and the wall is located between the camera module and the lens for blocking the light of the light emitting diode in the casing from being reflected to the camera module.

15. The image monitoring apparatus of claim 12 further comprising:
 a protruding block disposed on a side of the convex light-exit surface of the lens close to the camera module for blocking the light of the light emitting diode from being incident to the camera module.

16. The image monitoring apparatus of claim 15, wherein the protruding block extends from the casing.

17. The image monitoring apparatus of claim 15, wherein the protruding block is formed integrally with the lens.

18. The image monitoring apparatus of claim 12, wherein a section of the lens close to the camera module is made of opaque material for blocking the light of the light emitting diode from being incident to the camera module.

19. The image monitoring apparatus of claim 12, wherein the lens is disposed at a position outside a range of the vertical angle of view the camera module.

\* \* \* \* \*